United States Patent [19]
Thomas et al.

[11] Patent Number: 5,649,001
[45] Date of Patent: Jul. 15, 1997

[54] METHOD AND APPARATUS FOR ADAPTING A COMMUNICATION INTERFACE DEVICE TO MULTIPLE NETWORKS

[75] Inventors: Nicholas A. Thomas, Salt Lake City; John Evans, Riverton; Richard Bentley, South Jordan; Mark L. Gray, West Valley City, all of Utah

[73] Assignee: U.S. Robotics Mobile Communications Corp., Salt Lake City, Utah

[21] Appl. No.: 410,328

[22] Filed: Mar. 24, 1995

[51] Int. Cl.$^6$ .................................................. H04M 11/00
[52] U.S. Cl. ........................................ 379/93.07; 379/93.29
[58] Field of Search ............................... 379/98, 93, 59, 379/58, 63, 441, 442, 443; 375/222

[56] References Cited

U.S. PATENT DOCUMENTS

| | | | |
|---|---|---|---|
| 4,718,080 | 1/1988 | Serrano et al. | 379/59 |
| 4,991,085 | 2/1991 | Pleva et al. | 364/200 |
| 5,127,041 | 6/1992 | O'Sullivan | 379/59 |
| 5,134,648 | 7/1992 | Hochfield et al. | 379/98 |
| 5,167,021 | 11/1992 | Needham | 395/275 |
| 5,181,858 | 1/1993 | Matz et al. | 439/188 |
| 5,249,218 | 9/1993 | Sainton | 379/98 |
| 5,333,177 | 7/1994 | Braitberg et al. | 379/59 |
| 5,357,625 | 10/1994 | Arends | 395/500 |
| 5,430,793 | 7/1995 | Ueltzen et al. | 379/98 |

*Primary Examiner*—Stella Woo
*Attorney, Agent, or Firm*—Workman, Nydegger & Seeley

[57] ABSTRACT

A reconfigurable communication interface system is provided comprising a reconfigurable communication interface device and a communication adapter cable. The reconfigurable communication interface device contains means to identify a valid communication adapter cable. After an attached communication adapter cable is recognized as valid, operational values are downloaded from outside the communication interface device and the communication interface device software is reconfigured. Operational values may be loaded from the communication adapter cable or from the host computer. Adapter cables for a wide variety of applications such as various telephone networks, various cellular telephones, Ethernet networks, PBX type networks, ISDN type networks, optical networks, or other LAN and WAN type networks are provided.

16 Claims, 4 Drawing Sheets

METHOD AND APPARATUS FOR ADAPTING A COMMUNICATION INTERFACE DEVICE TO MULTIPLE NETWORKS

BACKGROUND OF THE INVENTION

1. The Field of the Invention

The present invention relates to communication devices for transmitting data between computers or the like and more particularly to methods and apparatus for adapting a communication device to the standards of a variety of networks.

2. Background of the Invention

In order to transfer data from one computer system to another computer system or other device, a communication interface device such as a modem is often used. A communication device is a device which converts digital data from the computer to an appropriate signaling format in order to be transmitted over a particular network such as a telephone network. A communication device is conventionally configured in the form of a single electronic card which may be placed internal to a computer or in the form of a box which can be connected external to a computer.

Because a communication device takes data from the computer and places it on to a network, a communication device is typically a dual port device, with one port being connected to the host computer and the other port being connected to the network over which data is to be transferred. Connections to the host computer are made in a variety of ways. For example, a communication device configured to reside external to a computer may communicate to the host computer over an RS232 serial port. As another example, a communication device in the form of a PCMCIA card is carried internal to the computer and interfaces with the host computer over the PCMCIA interface.

With the advent of small portable and transportable computers, and the wide spread availability of small form factor communication devices, such as communication devices on PCMCIA cards, mobile computing is becoming wide spread. In today's environment, it is not uncommon for an individual to have a powerful portable laptop computer that is taken wherever the individual travels. An individual traveling into several countries, or an individual connecting their computer to several different types of networks faces special challenges. Typically, each individual country or each individual network requires a different communication device and/or a different connection.

With the widespread availability of powerful portable computers and easy travel routes, it is not uncommon for an individual to utilize their computers at a wide variety of different locations. Thus, an individual may begin the day in an office where the computer is to be connected to a local area network (LAN) or wide area network (WAN) and end the day in a completely different city where data is to be transferred over a telephone network to another computer. Alternatively, an individual may begin the day transferring data over the telephone network in one country and end the day transferring data over a telephone network of another country.

In order to avoid having to carry several different communication devices such as modems configured to access the telephone networks of several different countries, there has been an attempt to divide the modem into a part which can be used with any telephone network and a part which specifically adapts the modem to a particular country's telephone network. In one such attempt, the basic modem circuitry resides on a board which is carried internal to the computer. The modem has a single connector to which a variety of adapters could be attached. When a new country is entered which has a different telephone network standard, the proper adaptor can be attached to the modem and the modem would be reconfigured to work with that specific adaptor. This eliminates the necessity of carrying multiple modems but also creates the problem of properly configuring the modem to work with a particular adaptor.

In order to make configuration easier, one approach has been to place hardware inside the adaptor which contains an ID code. The modem could then poll the adaptor to determine its ID code, look up parameters stored in memory based on the ID code, and reconfigure the internal software of the modem based on the parameters to work with that particular adaptor. While this approach has helped eliminate the need for a user to manually configure the modem to work with various adapters, again it created several problems. For example, a modem which must be configured to work with a plurality of adapters must contain complex software which will reconfigure itself to work with any adapter. Furthermore, the modem must contain the parameters associated with all adapters to be used with the modem. Thus, such a modem is necessarily more expensive due to the increased software complexity and increased hardware needed to store the parameters needed to reconfigure the software.

In an effort to reduce the complexity and size of the software, different modems could be configured with different adapter packages. For example, a user which frequents relatively few different countries could purchase a modem specifically designed to work with that combination of countries. This, however, requires manufactures to produce a wide variety of modems, each tailored to various combinations of countries. It would, therefore, be an advancement in the art to have a modem which was capable of working with a variety of adapters and which reduced the complexity of any attendant software and reduced the hardware needed to store and execute such software.

When a modem contains the parameters associated with all adapters to be used with the modem, updating the parameters becomes problematic. If the parameters associated with a particular adaptor are modified, the stored parameters on each individual modem must be updated. If the parameters are on a ROM which is programmed at the time the modem is manufactured, often this entails the replacement of the entire modem. Alternatively, the part of the modem containing the parameters may be replaced. When new adapters are developed and released, a similar problem occurs. A means must be provided to add new information to the modem. Again, this may entail replacement of the entire modem or replacement of a portion of the modem.

The advent of networks over which data may be transferred has significantly increased the usefulness and portability of computers. Unfortunately, a user who desires to connect to a wide variety of networks is also presented with many problems. Each individual type of network often has its own physical communication medium. For example, the telephone network in the United States typically utilizes two single wire conductors. These conductors are typically tied to an RJ11 type plug. Thus, those desiring to access the telephone network must have a modem capable of accepting an RJ11 type plug. Other countries utilize different types of connectors and may also have a different number of conductor wires. Thus, an individual desiring to access the telephone networks of other countries must have modems designed to interface with the standard connectors in the countries. In addition, each country may have different services available and different protocols which must be followed when communicating over the telephone network located in that country.

In addition to land line access to telephone networks, the telephone networks of many countries may also be accessed through a cellular phone system. Because of the wide variety of cellular telephones available, and because each type of cellular telephone often has its own proprietary interface, connecting to a cellular telephone often requires a modem configured specifically to attach to the desired type of cellular telephone. When the different types of cellular telephone networks in different countries are factored in, an individual traveling to multiple countries and communicating data over the cellular network may face a tremendous challenge.

In an effort to provide the capability to work with a plurality of cellular phone types, attempts have been made to develop a common or standardized interface language. This interface language would then be used by the modem to communicate with a device specific adapter. The device specific adapter would then convert the standard interface language into the specific commands needed to communicate with the specific cellular phone type. In one such attempt, the device which interfaced with the cellular phone could determine which cellular phone type was connected to the device. While this allows a user to utilize a single adapter with a wide variety of cellular phone types, the adapter is necessarily complex and expensive.

In order to overcome this limitation, it may be possible to create a different adapter for each cellular phone type. This would allow an individual to simply buy the type of adapter needed to interface with the desired cellular phone type. Unfortunately, such a device is still quite complex since it must convert the standard interface language utilized by the modem to the particular interface language utilized by the cellular phone. It would, therefore, represent an advancement in the art to provide the capability to interface with a wide variety of cellular phone types from a single modem through greatly simplified adapters. It would also represent an advancement in the art to communicate with a wide variety of cellular phone types even though the amount of program storage was relatively low and even though the program complexity was relatively low.

In addition to telephone networks, current computers may also be utilized with a wide variety of other data networks. Examples of such networks include Ethernet (either in a 10bT or 10b2 type network), a PBX type network, an ISDN type network, or other LAN and WAN type networks. Each of the variety of networks to which a computer may be attached, requires different hardware connections and different communication protocols. Currently, a user must have an individual networking card for each different type of network to which his computer will be attached. Thus, a user may need an Ethernet card, a PBX card, and an ISDN card if the computer is to be attached to these various types of networks. Along with increased cost and complexity, such a situation is highly inconvenient since the user must carry a wide variety of networking cards if his computer is to be carried from location to location and connected to these networks. It would therefore, represent an advancement in the art to have a single communication device which could be used to connect to different types of networks.

In addition to connecting through networks and communicating data, computers may also be utilized to communicate sound or voice over such networks. Currently, a separate voice or sound capable modem must be utilized to connect the computer to a network, such as a telephone network, over which sound or voice is to be communicated. If the voice interface connection is different than the data connection, then either a separate modem must be provided or a separate adapter must be provided. Again, when multiple functions are integrated into a modem, the software complexity increases and the amount of hardware needed to support the increased software also increases. Thus, multiple function modems are inherently more complex than single function modems. It would thus represent an advancement in the art to provide a multiple function modem which reduces the complexity of the software and reduces the amount of hardware needed to provide such multiple functions.

While the ability to connect to multiple telephone networks has previously been attempted through adapters, care must often be taken when plugging the adapters into the modem. When an adapter is plugged into a modem, the modem must be configured to recognize the adapter. In order to facilitate this configuration, adapters have been provided with IDs which will allow the software in the modem to reconfigure itself according to the specifications needed to work with that particular adapter. This raises the question as to when the reconfiguration routine should be called. In one such attempt to resolve this issue, the configuration routine is invoked by the user after the adapter is changed. This approach places the burden of remembering to call the configuration routine on the user. If the user forgets to call the configuration routine, data loss or, perhaps, serious physical damage to the modem may occur.

In order to prevent this occurrence, the modem can be placed into a polling mode where it periodically reads the ID from the cable attached to the modem and if needed automatically reconfigures the software. This method, however, requires that the modem be looking for a change in the adapter. If the modem is utilized in a portable laptop computer, allowing the modem to remain continuously active wastes precious battery power. In order to conserve battery power in portable applications, modems are often provided with a sleep mode. Thus, when not in use, modems are placed into a low power mode. Such a polling methodology, then, is often unrealistic for portable applications where battery power is limited. It would, therefore, represent an advancement in the art to provide a way of transparently re-configuring an adaptable modem in portable applications.

Because adapters can be attached and removed at will, in order to avoid data loss care must be taken to limit when the adapter is removed. For example, if the user removes the adapter when the modem is in sleep mode, the modem must not assume that the same adapter which was connected prior to sleep is still in place. If a new adapter with different electrical characteristics is inserted while the modem is in sleep mode, and the modem awakes assuming the prior adapter is still attached, a conflict in the electrical connection could occur damaging the modem, the adapter, or the network. It would, therefore, represent an advancement in the art to have a method to determine when an adapter is disconnected from a reconfigurable modem which is designed for portable applications.

SUMMARY AND OBJECTS OF THE INVENTION

It is an object of the present invention to provide a reconfigurable communication interface device capable of being used in a variety of countries by exchanging communication adapter cables.

Another object of the present invention is to provide a reconfigurable communication interface device capable of working with a variety of networks by exchanging communication adapter cables.

A still further object of the print the reconfigurable conduce the amount of hardware in the reconfigurable communication interface device needed to store the information necessary to reconfigure the modem to a particular communication adapter cable.

Yet another object of the present invention is to provide a reconfigurable communication interface device which can be utilized with either a telephone network, cellular network, local area network, or WAN.

Another object of the present invention is to provide protection from foreign cables.

Another object of the present invention is to provide a reconfigurable communication interface device which can detect when communication adapter cables have been changed.

A still further object of the present invention is to provide a reconfigurable communication interface device which automatically configures itself to operate with any valid communication adapter cable.

Another object of the present invention is to provide a communication adapter cable which includes the specific hardware needed to interface to the desired network.

A still further object of the present invention is to provide a communication adapter cable which contains an identification code that can be read by a reconfigurable communication interface device in order to determine which configuration parameters should be used to configure the interface device software.

A still further object of the present invention is to provide a communication adapter cable capable of storing more information than just a cable identification parameter.

Another object of the present invention is to provide a reconfigurable communication interface device which is capable of correctly detecting and re-configuring its software and hardware interface when a communication adapter cable is removed or inserted while the communication interface device is in sleep mode.

Yet another object of the present invention is to provide a reconfigurable communication interface device which is easily updated to accommodate new products.

A still further object of the present invention is to provide a reconfigurable communications interface device which is easily updated if parameters for a particular communication adapter cable are modified or changed.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the amended claims. To achieve the foregoing objects, and in accordance with the invention as embodied and broadly described herein an reconfigurable communication interface device and associated communication adapter cable is provided.

The reconfigurable communication interface device has a computer interface in order to communicate with the host computer and a universal connector in order to attach to a wide variety of communication adapter cables. The communication interface device is configured with the standard features generally known to those skilled in the art. In the preferred embodiment such a communication interface device is designed to fit within a small form factor such as a PCMCIA card. Such a small form factor communication interface device would also be expected to have energy conservation features such as a sleep mode in order to conserve energy in a portable computer.

A variety of communication adapter cables are provided to adapt the communication interface device to the characteristics of a particular network by attachment to the universal connector. The communication adapter cable thus has one end capable of attaching to the universal connector on the communication interface device and another end which is capable of attaching to the desired network. In one preferred embodiment the communication adapter cable also contains an identification code which can be read by the communication interface device. The communication interface device is designed to verify that the identification code represents a valid communication adaptor cable.

Once the communication interface device has determined that the communication adapter cable is valid, the communication interface device then loads a set of operating values from a location outside of the communication interface device. The set of operating values can include specific network parameters such as filter coefficients for tone detection, relay control timing parameters, option flags, protocol parameters, and the like, as well as specific executable code such as device drivers, software input/output routines, and the like. In one embodiment the operating values are carded inside the communication adapter cable and loaded to the communication interface device from the communication adapter cable. In another embodiment, the values are loaded from another external source such as a diskette or other storage device outside the communication interface device.

Once the operating parameters have been obtained by the communication interface device, the operating parameters are utilized to reconfigure the communication interface device software and hardware interface in order to provide appropriate functionality to the communication adapter cable. The universal connector contains a variety of control lines through which the network interfacing is accomplished. The control lines allow the communication interface device to access network specific hardware committed to, or located on, the communication adapter cable. An example of such network specific hardware would be the DAA circuitry needed to interface to the telephone network of a particular country.

The preferred embodiment of the reconfigurable communication interface device also contains hardware to detect when a communication adapter cable is connected to, or removed from, the universal connector. The hardware is designed to generate an interrupt when the communication adapter cable is attached to, or detached from, the communication interface device. The hardware, firmware, and software in the communication interface device are configured so as to work properly no matter when the cable is plugged in or removed from the communication interface device. Thus, communication interface devices incorporating a sleep or low power mode work properly when a communication adapter cable is attached to or detached from the communication interface device.

In order to allow the communication adapter cable to be attached or removed when the reconfigurable communication interface device is powered, means to protect the communication interface device, the communication adapter cable, and the network are provided. In the preferred embodiment this means comprises placing the conductors connected to the universal connector in a high impedance state whenever there is no communications adapter cable attached to the universal connecter. Further, when a communication adapter cable is attached, the communication interface device will not access the network specific hardware through the control lines until the communication interface device has been reconfigured to work with that specific communication adapter cable.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The instant invention is directed to a reconfigurable communication interface device and an associated communication adapter cable. The purpose of the invention is to allow a computer or other device to be connected to a wide variety of communication networks or devices simply by replacing the communication adapter cable. As used within this application, "communication interface device" refers to a device which connects a computer or other peripheral to a communication network. In the context of wire line or cellular networks, the communication interface device is often a modem. In the context of other types of networks, the communication interface device is typically a digitally switched networking card which resides in the computer or other peripheral.

Figure 1:
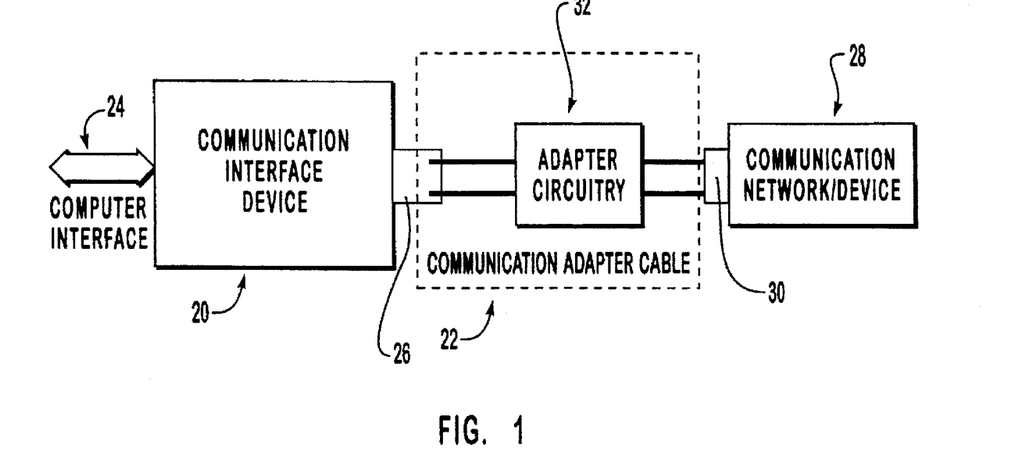
FIG. 1 is a top level block diagram depicting the communication interface device and the communication adapter cable.

Referring to FIG. 1, an overall block diagram of the communication interface system is depicted. The communication interface system comprises communication interface device 20 and communication adapter cable 22. Communication interface device 20 has computer interface 24. Computer interface 24 is the means by which communication interface device 20 communicates with the computer or other peripheral to which the interface device is attached.

Communication interface device 20 can be configured in a wide variety of form factors. For example, in one embodiment communication interface device 20 comprises a communication card carried internal to a computer or other peripheral. In another embodiment, communication interface device 20 comprises a small form factor communication card which can be carried internal to a portable laptop, notebook, or other portable computer. One such form factor which may be utilized in low power portable applications is the PCMCIA card form factor. In still another embodiment, communication interface device 20 comprises a separate communication card which is attached external to the computer or other peripheral.

Communication interface device 20 also includes a universal connector means. The universal connector means is the means by which communication adapter cables are attached to communication interface device 20. By way of example, and not limitation, in FIG. 1 the universal connector means is depicted as universal connector 26. In one preferred embodiment, universal connector 26 comprises a multi-conductor connector. Any multi-conductor connector which has sufficient conductors to carry the signals needed to interface with the communication adapter cable may be utilized for universal connector 26. In one preferred embodiment, universal connector 26 comprises a 15 conductor connector. Communication interface device 20 also comprises loading means to load operating values from a location outside communication interface device 20. As used herein "loading" refers both to uploading and downloading. In one preferred embodiment, operating values are downloaded from the host computer over computer interface 24. In another preferred embodiment, operating values are uploaded from communication adapter cable 22. As used within the scope of this invention "operating values" refers to all information needed to configure communication interface device 20 to work with communication adapter cable 22. Operating values includes, but is not limited to operating parameters, such as filter coefficients, timing parameters, pointers to access or prevent access to features or routines, particular cellular phone command sets, and the like, as well as executable instructions such as subroutines, specific device drivers, and the like.

Communication adapter cable 22 connects communication interface device 20 to communication network 28. It will be understood that communication network 28 can be any type of communication network. For example, telephone networks, cellular networks, Ethernet networks, PBX networks, ISDN networks, optical networks, or LAN and WAN type networks may be utilized with this device. In addition, communication network 28 may also be a cellular phone type network. In such an instance, communication adapter cable 22 would be connected to a cellular phone which would then provide access into the cellular communication network. Finally, communication network 28 may also be a voice acoustic coupler which can be utilized to tap into a standard telephone network. Other communication networks or devices may also be used with the instant invention and the examples given herein should be construed as exemplary only and not limiting the scope of this invention.

Communication adapter cable 22 comprises a universal connector means which is used to connect communication adapter cable 22 to communication interface device 20. In FIG. 1, universal adapter means is depicted as universal connector 26. In this diagram, universal connector 26 represents half of the connector which is used to connect communication adapter cable 22 to communication interface device 20.

Communication adapter cable 22 also includes a means of network connection. Such network connection means connects communication adapter cable 22 to communication network 28. Because of the wide variety of communication networks and devices which can be utilized, the network connection means must depend on the type of communication network or device which will be connected to communication adapter cable 22. By way of example and not limitation, in FIG. 1, network connection means is depicted as network connector 30. Network connector 30 is a communication network specific connector designed to have the proper number of conductors and proper configuration in order to attach to the appropriate communication network. For example, if the communication network were a typical telephone network in the United States, network connector 30 would comprise an RJ11 type telephone jack. On the other hand, if connection into a cellular network is desired, network connector 30 would be designed to attach to a cellular telephone. Because of the wide variety of cellular telephones available, and because each cellular telephone has a particular interface plug, network connector 30 would depend upon which specific cellular telephone was selected.

Communication adapter cable 22 also comprises adapter circuitry 32. Adapter circuitry 32 comprises the circuitry needed to connect communication interface device 20 to communication network 28. Such circuitry may comprise DAA circuitry or other network specific functions. In one preferred embodiment, adapter circuitry 32 also comprises means to store a communication adapter cable identification code. This communication adapter identification code may be transferred to communication interface device 20. Such a code would allow communication interface device 20 to determine which communication adapter cable was connected to the universal connector means.

In another preferred embodiment, adapter circuitry 32 also comprises means to store a plurality of operating values which correspond to the operating characteristics of the given communication network. Operating values have been previously defined and includes all information needed to reconfigure communication interface device 20 to work with communication adapter cable 22 such as executable code as well as other parameters.

Figure 2:
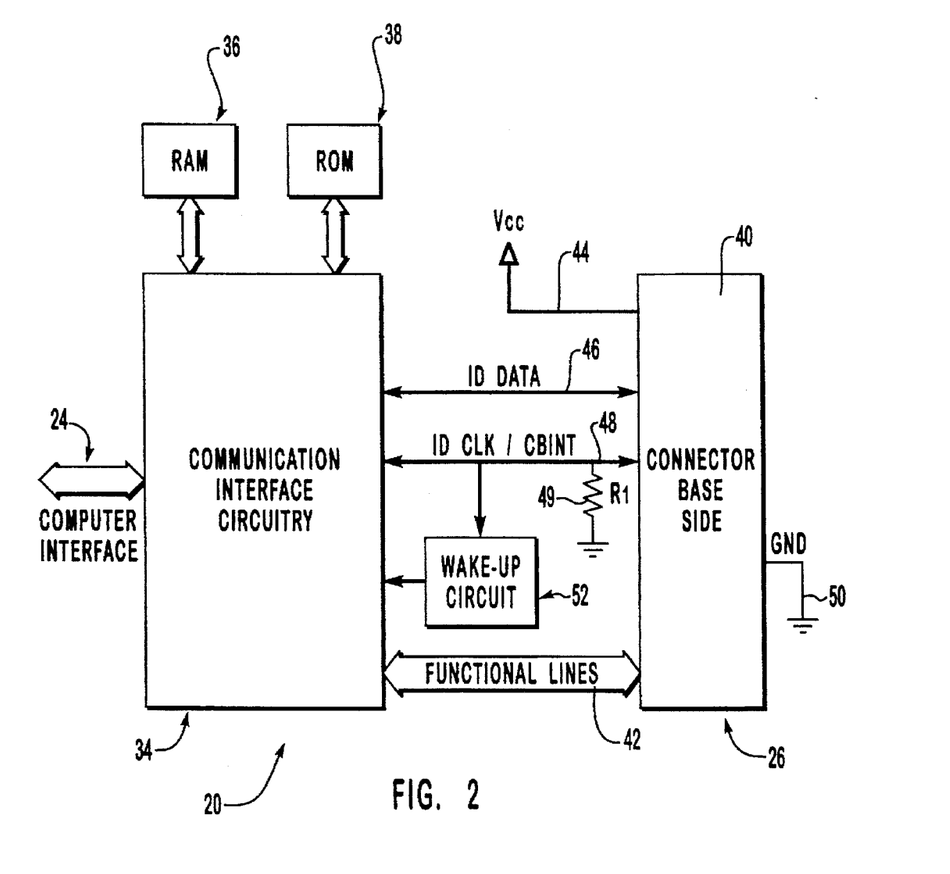
FIG. 2 is a block diagram of the communication interface device.

Referring now to FIG. 2, a top level block diagram of communication interface device 20 is depicted. In one preferred embodiment, communication interface device 20 comprises communication interface circuitry 34. A wide variety of micro-control units (MCU), microcomputers, digital signal processors (DSP), and the like may be used to construct communication interface circuitry 34.

When communication interface device 20 is designed to work with wired or cellular telephone networks, communication interface device 20 is preferable configured with the advanced features normally associated with advanced modem design. Such features include, but are not limited to, the provisions for both manual and automatic dialing, provisions for both manual and automatic answering, provisions for multiple data rates and communication protocols, asynchronous communication between the modem and host computer, automatic recall of previous configuration when switched on, a range of various data formats, standardized AT commands, automatic communication adapter cable equalization, pulse dialing or frequency dialing, detection of current communication state, ring detection, diagnostic ability, and other features. Communication interface device 20 is designed to work with other types of networks, features normally associated with those networks are also provided.

In the presently preferred embodiment, however, communication interface circuitry comprises a chip set specifically designed for communication applications. Such chip sets are available from Rockwell, AT&T, Cirrus, Sierra, Motorola, Intel, Zylog, and other manufactures. Such chip sets are often depicted as single or multi chip modem chip sets. Such chip sets typically comprise a micro control unit and a digital signal processor portion. Such chip sets typically include a wide variety of standard features normally associated with sophisticated modem design. Features common to such designs are presently preferred. When communication interface device 20 is designed to be utilized in a low power or portable application where battery power is at a premium, it is presently preferred that communication interface circuitry 34 be capable of supporting a low power sleep mode. In such a mode, communication interface circuitry will, under certain criteria, enter a low power standby or sleep state whereby power consumption is greatly reduced.

Associated with communication interface circuitry 34 is a program storage means. Such program storage means contains executable instructions and parameters which will be utilized by communication interface circuitry 34. Thus, by modifying the information contained in such a program storage means, the behavior of communication interface circuitry 34 can be custom tailored to the particular communication adapter cable and communication network to which communication interface device 20 is presently attached. In FIG. 2, such program storage means is depicted by RAM 36 and ROM 38. Although the terms RAM and ROM are utilized in FIG. 2, it will be appreciated that such program storage means can be implemented through any conventional memory storage device including EEPROM, PROM, RAM, ROM and the like. Typically program storage means will comprise both permanent and non-permanent storage. The detailed software designed to operate communication interface circuitry 34 is not described herein but is known to those skilled in the art and is often available through the manufactures of the modem chip sets.

Returning now to FIG. 1, communication interface device 20 also comprises universal connector means to connect communication interface device 20 to communication adapter cable 22. In FIG. 2, such universal connector means is depicted by universal connector 26 and associated hardware. In FIG. 2, universal connector 26 comprises connector base side 40 and a plurality of conductors. One group of conductors is functional lines 42. Functional lines 42 are those lines necessary to access the device specific functions contained on communication adapter cable 22.

In one preferred embodiment, communication adapter cable 22 comprises means to store a communication adapter cable identification code. In such a preferred embodiment, communication interface device 20 must include loading means to access such a communication adapter cable identification code. In FIG. 2, the loading means to access the communication adapter cable identification code comprises four discrete conductors labeled Vcc 44, IDDATA 46, IDCLK/CBINT 48, and GND 50. These four conductors comprise a serial interface which allows communication interface circuitry 34 to access a communication adapter cable identification code stored on communication adapter cable 22. In the preferred embodiment shown in FIG. 2, IDDATA line 46 and IDCLK/CBINT line 48 are bi-directional lines which can be used either to read information from, or write information to, communication adapter cable 22. IDDATA line 46 is the line over which serial data is transferred. IDCLK/CBINT line 48 is a multi-function line used to provide a clock signal to clock the data on IDDATA line 48 and to generate an interrupt to communication interface circuitry 34.

In one preferred embodiment of the present invention, communication interface device 20 can detect when communication adapter cable 22 is connected to or removed from the universal connector means. In order to achieve this detection capability, in one preferred embodiment an interrupt means is provided which generates an interrupt when communication adapter cable 22 is attached to, or removed from, the universal connector means. In FIG. 2, such interrupt means comprises IDCLK/CBINT line 48. In this preferred embodiment, IDCLK/CBINT line 48 is connected to ground through pull down resistor R1 49. This allows IDCLK/CBINT line 48 to be pulled low whenever there is no communication adaptor cable attached to universal connector 26. When communication adapter cable 22 is connected to or removed from universal connector 26, a signal on IDCLK/CBINT line 46 generates an interrupt in communication interface circuitry 34.

The generated interrupt signal allows communication interface device 20 to notify the user when communication adapter cable 22 has been attached or removed. Such notification can come by playing an insertion tune for cable insertion and by playing a removal tune for cable removal. Other ways can also be used to notify the user such as printing a message on the screen. Further, if an invalid communication adapter cable is detected upon insertion, notification can be given to the user in a similar fashion.

If communication interface circuitry 34 has a low power standby or sleep mode, communication interface circuitry 34 may be in a sleep mode when communication adapter cable 22 is connected to, or removed from, universal connector 26. In order to allow communication interface circuitry 34 to work properly with such a low power or sleep mode, wake up circuit 52 may be tied to IDCLK/CBINT line 48. In one preferred embodiment, when communication adapter cable 22 is connected to universal connector 26, IDCLK/CBINT line 48 triggers wake up circuit 52 which brings communication interface circuitry 34 out of the sleep mode into an active mode. In another preferred embodiment, wake up circuit 52 is triggered when communication cable 2to univ- moved from or connected to universal connector 26.

Although the detailed implementation of IDDATA line 46 and IDCLK/CBINT line 48 will depend on the implementation of communication interface circuitry 34, in the presently preferred embodiment, these lines are implemented such that a communication adapter cable can be plugged into, and removed from, universal connector 26 at any time. This may involve placing these lines and other functional lines (42 in FIG. 2) in a high impedance state when no communication adapter cable is attached. Those skilled in the electronic design art can provide appropriate circuitry to prevent problems such as port contention or latch-up when a cable is "hot swapped." The term "hot swapped" includes attaching or removing a communication adapter cable from universal connector 26 while communication interface circuitry 34 is at least partially powered, and line 44 is attached to Vcc. Precautions to prevent problems may also have to be taken in communication adapter cable 22 to provide hot swap capability.

Figure 3:
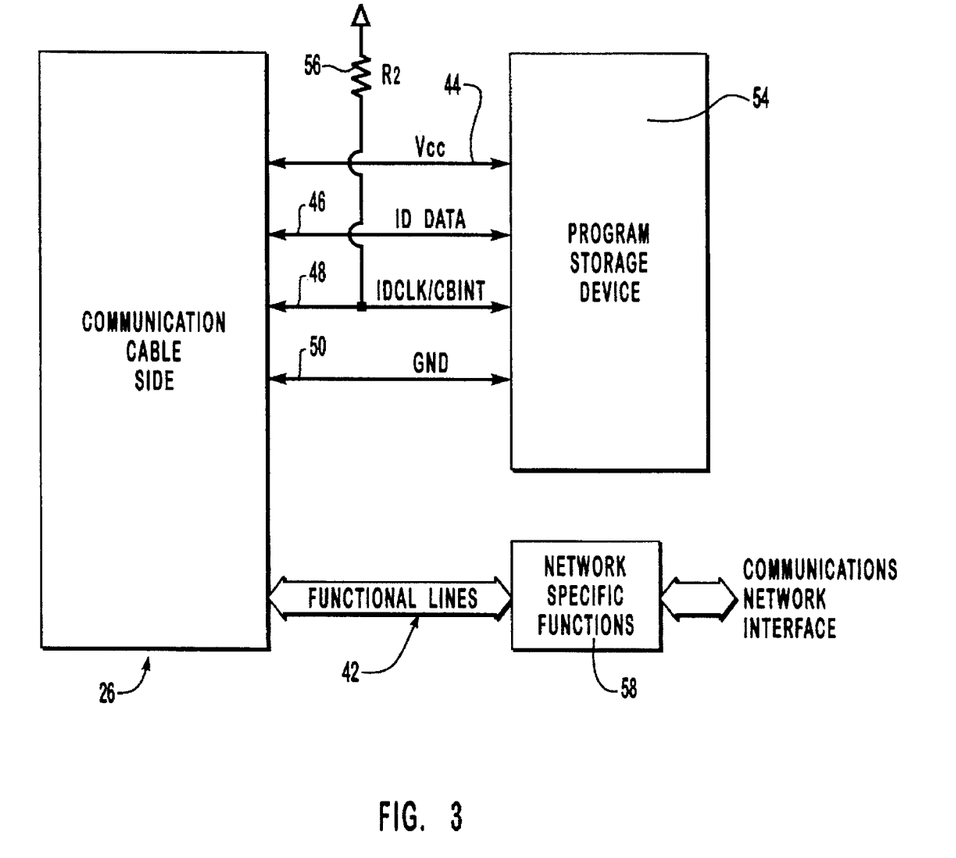
FIG. 3 is a block diagram of the communication adapter cable.

Turning now to FIG. 3, a top level block diagram of communication adapter cable 22 is presented. In one preferred embodiment, communication adapter cable 22 comprises program storage means for storing a communication adapter cable identification code. In FIG. 3, such program storage means is illustrated by program storage device 54. Program storage device 54 is designed to interface with communication interface device 20 over a serial interface comprising Vcc line 44, IDDATA line 46, IDCLK/CBINT line 48, and GND line 50. A wide variety of common devices can be used to implement program storage device 54. In the presently preferred embodiment, however, program storage device 54 is implemented using ATMEL, AT24C or Excel 24C 2K, 4K, 8K, or 16K bit 2-wire serial EEPROM or equivalent.

Referring again to FIG. 3, in one preferred embodiment IDCLK/CBINT line 48 is tied to pull up resistor R2 56. In this particular embodiment, this will enable communication interface circuitry 34 to detect a level transition when communication adapter cable 22 is attached to communication interface device 20 through universal connector 26. Similarly, such an arrangement will allow detection through a falling level when communication adapter cable 22 is removed from communication interface device 20.

In one preferred embodiment, communication adapter cable 22 also comprises program storage means for storing a plurality of operating values which correspond to operating characteristics of a given communication network. In one preferred embodiment, such operating parameters are stored in the same program storage means containing the communicating adapter cable identification code. In FIG. 3, such program storage means is depicted by program storage device 54. Because program storage device 54 can be implemented utilizing a serial EEPROM containing a plurality of storage locations, such a program storage device provides a convenient location to store the desired operating values.

Because each communication network requires different interface circuitry, communication adapter cable 22 also comprises network specific functions 58. Network specific functions 58 comprises all circuitry needed to properly interface communication interface device 20 with communication network 28. In one preferred embodiment, network specific functions 58 comprises the particular DAA circuitry needed to adapt communication interface device 20 to communication network 28. In another preferred embodiment, network specific functions 58 comprises circuitry necessary to allow communication interface device 20 to connect to a particular type of cellular phone. In still another preferred embodiment, network specific functions 58 comprise circuitry necessary to allow communication interface device 20 to connect to a particular type of network. Such a network may be an Ethernet network, a PBX-type network, an ISDN-type network, an optical type network, or other LAN or WAN type network.

Figure 4A:
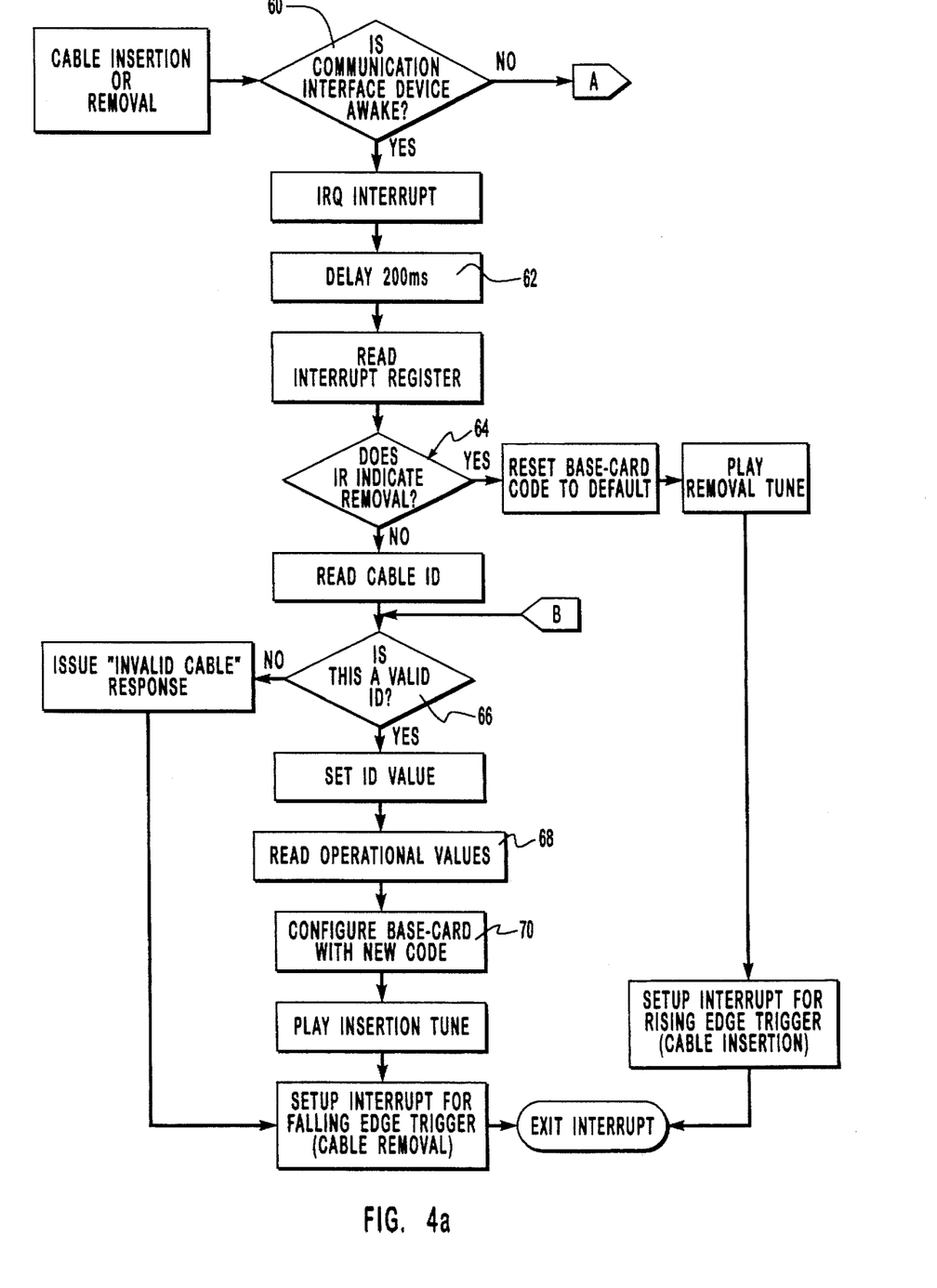
FIG. 4a is a flow chart depicting the actions of the communication interface device upon insertion or removal of the communication adapter cable.

Turning next to FIG. 4, a flow diagram depicting how one preferred embodiment of communication interface device 20 reacts when communication adaptor cable 22 is attached to, or removed from, the universal connector means. When a cable is inserted or removed, in one preferred embodiment communication interface device 20 reacts differently if the communication interface device is in an active mode or if the communication interface device is in a low-power sleep mode. Such a distinction is depicted in FIG. 4A by decision block 60. If communication interface device 20 is awake, then an interrupt request is generated and a short delay is made. This delay, illustrated by delay step 62 in FIG. 4A, allows the signals to stabilize.

Once the signals are stabilized, the value of an interrupt register is tested. This is represented by testing step 64 in FIG. 4A. In one preferred embodiment, the value of the interrupt register will be different depending on whether communication adaptor cable 22 was inserted into universal connector means or removed from the universal connector means. As illustrated in testing step 64, if communication adaptor cable 22 has been removed, the base card code is reset to a default value, an indication that the cable has been removed is given to the user (such as by playing a removal tune), and the interrupt register is set to respond to a cable insertion. The interrupt routine is then exited. In this flowchart "base card code" includes the operating values of communication interface device 20. Other executable instructions and program values may also be included.

Returning now to testing step 64, if the interrupt register indicates that a cable has been inserted, the cable identification code is read and tested to determine if the connected cable is a valid communication adaptor cable. This is illustrated by testing step 66 in FIG. 4A. In one preferred embodiment, all currently valid cable identification codes are stored in ROM 38. Once the cable identification code has been read, if the identification code can be found in ROM 38 then the communication interface device knows that the communication adaptor cable is a valid device. Checking for valid devices through means such as this is an important step in this invention. For example, if an invalid communication adaptor cable was attached to communication interface device 20, there is no guarantee that electrical compatibility exists. Thus, severe damage may occur through electrical incompatibility. In addition, if an invalid communication adaptor cable is connected to communication interface device 20 any operational values stored in communication adaptor cable 22 may be invalid and cause malfunction of communication interface device 20. Thus, until the communication adapter cable has been determined to be a valid device, the control lines used to access the device specific hardware on the device will not be used.

As an alternative to storing the communication adaptor identification values in ROM 38, an erasable permanent storage medium may also be used. For example, communication adaptor cable identification codes may be stored in an EEPROM. This would allow updating of any communication adaptor cable identification code list or operating values without removal or replacement of either communication interface device 20 or ROM 38. Other types of erasable, permanent storage media may also be used.

As an alternative to storing a list of communication adaptor cable identification codes in a permanent storage media and comparing an identification code to the codes stored in the permanent storage media, communication adaptor cables may be configured to provide a valid response to a query from communication interface device 20. Thus, for example, when communication adaptor cable 22 is attached to communication interface device 20, communication interface device 20 can send a signal to communication adapter cable 22. Communication adapter cable 22 must then respond with a valid response code. The response codes could be common to various types of adapter cables. In this way, only a single or a very few identification codes must be known to communication interface device 20.

Communication adaptor cable identification codes may comprise a wide variety of lengths and code structures. For example, communication adaptor cable identification codes may comprise a single byte of information. Such a single byte would potentially identify 511 different devices. (One code must be reserved to identify when no communication adaptor is attached.) In the presently preferred embodiment, however, communication adaptor identification cable codes comprise a three-byte word. The first byte represents a product group code. The second byte represents a product name code. And the third byte is preferably a stop byte to signal communication interface device 20 to stop reading information. Alternatively, however, this byte could be utilized for a product description code. Table 1 contains the preferred product group byte codes, and table 2 contains the preferred product name byte codes.

TABLE 1

Product Group Byte Codes.

| Byte Code | Product Group |
|---|---|
| 00 | Wire Line/Modem |
| 01 | Voice |
| 02 | PBX |
| 03 | LAN |
| 04 | Leased Line |
| 05 | CDPD |
| 06 | ISDN |
| 07 | International - German |
| 08 | International - France |
| 0A | International - Sweden |
| 0B | International - Denmark |
| 0C | International - Norway |
| 0D | International - Netherlands |
| 0E | International - Switzerland |
| 0F | International - Austria |
| 10 | International - Belgium |
| 11 | International - Ireland |
| 12 | International - Italy |
| 13 | International - Spain |
| 14 | International - Australia |
| 15 | International - S. Africa |
| 16 | International - Czech |
| 17 | International - Poland |
| 18 | International - UK |
| 19 | Cellular - JRC 829 |
| 1A | Cellular - NovAtel 830 |
| 1B | Cellular - OPEN |
| 1C | Cellular - Mitsubishi |
| 1D | Cellular - NEC |
| 1E | Cellular - Nokia |
| 1F | Cellular - OKI |
| 20 | Cellular - Motorola |
| 21-FE | RFU* |

*Reserved for future use

TABLE 2

| | PRODUCT NAME | | | |
|---|---|---|---|---|
| BYTE CODE | LAN PRODUCTS | WIRELESS PRODUCTS | CDPD | VOICE |
| 00† | — | — | — | — |
| 01 | MHz Ethernet 10 Base-2 | XJ3144 | CD1144 | Voice/Mod 16 bit audio |
| 02 | Ethernet/Mod 1-OBT(twpr) | RFU* | CD1144-dat | RFU* |
| 03 | Ethernet/Mod 10B-s (coax) | RFU* | RFU* | RFU* |
| 04 | V-34 E/M 10-B-T (twpr) | RFU* | RFU* | RFU* |
| 05 | MHz Ethernet 10 8-T | RFU* | RFU* | RFU* |
| 06-FE | RFU* | RFU* | RFU* | RFU* |

†Code 00 always represents Land Products
*Reserved for future use.

Returning now to FIG. 4A, if testing step 66 indicates that the communication adaptor cable ID represents an invalid device, the system issues an invalid response, sets the interrupt hardware to detect a cable removal, and exits the routine. If, however, the communication adaptor cable identification code represents a valid device, the ID value is saved, and the operational values are read. This is indicated in FIG. 4A by the read operational value step 68.

As previously indicated, operational values may be stored on communication adaptor cable 22. This methodology has distinct advantages since the operational values needed to ensure that communication adaptor cable 22 operates in a correct manner are contained on the cable. When new products are added, or if the operational values are updated, the new cables are simply produced with the appropriate parameters thereon. There is, thus, no need to update the information contained on the modem when operational values are modified. Similarly, since the operational values are contained on the cable, they cannot get lost or become separated from the cable. Thus, the correct operational values are always accessible to communication interface device 20 when communication adapter cable 22 is attached.

As an alternative, operational values may be read from other locations outside the communication interface device 20. As one example, the operational values may be read from a removable or fixed disk located on the computer. In such an embodiment, the operational values would be read through computer interface 24. Operational values may also be read from other locations located inside the computer over computer interface 24.

Returning to FIG. 4A, once the operational values have been read, the base card code is configured in accordance with the operational values. Reconfiguration may include replacing various parameters located in the software, preventing access or granting access to particular features, and replacing entire software modules or drivers with the appropriate operational values. Furthermore, as part of this reconfiguration process control lines 42 used to access network specific functions 58 are also configured and made active. In FIG. 4A, this reconfiguration step is illustrated by configure base card step 70.

After communication interface device 20 has been reconfigured to work with communication adaptor cable 22, an indication that a cable has been inserted, such as by playing insertion tune, is given and the interrupt hardware is setup to detect removal of the cable. The interrupt routine is then exited.

Figure 4B:
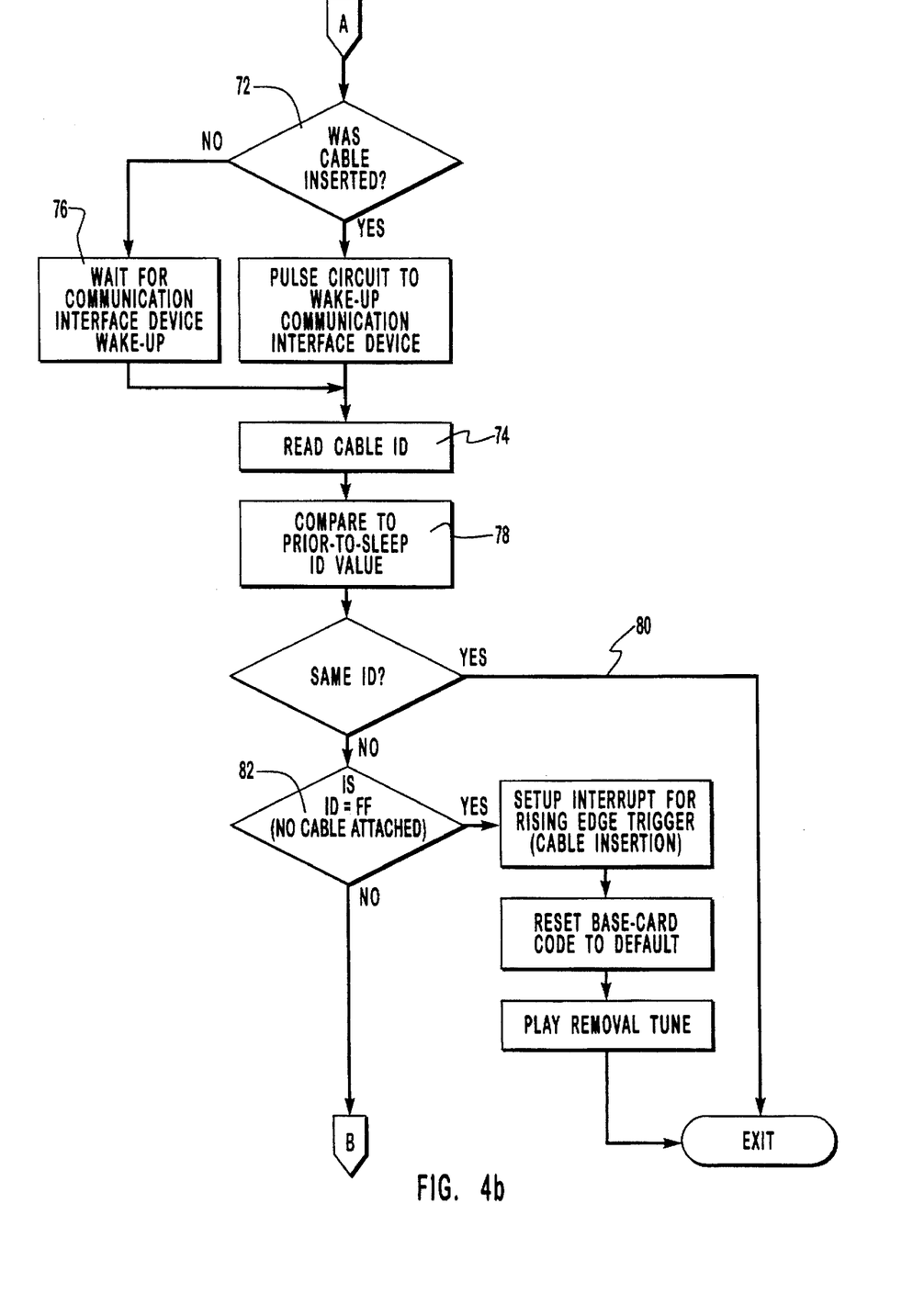
FIG. 4b is a continuation of the flow chart depicting the action of the communication interface device when a communication adapter cable is inserted or removed.

Returning now to decision block 60, if the communication device is not awake, the flow chart continues to FIG. 4B. FIG. 4B presents a flow diagram illustrating the operation of one preferred embodiment when a communication adapter cable is attached to, or removed from, the universal connector means when the communication interface device is in a low power sleep mode. In one preferred embodiment, when a communication adapter cable is attached to, or removed from, the universal connection means, the circuitry attached to the universal connection means wakes communication interface device 20 and processing proceeds as previously described in connection with FIG. 4A. In another preferred embodiment, when a communication adapter cable is removed from the universal connection means when communication interface device 20 is in sleep mode, processing proceeds in a different manner than when a communication adapter cable is attached to the universal connector means while communication interface device 20 is in sleep mode. FIG. 4B presents the processing of one such preferred embodiment.

Referring to FIG. 4B, since the preferred embodiment depicted by this flow diagram responds differently when in sleep mode, depending on whether communication adapter cable 22 is attached to, or removed from the universal connector means, the first step is to detect whether the cable was inserted or removed. This is depicted in FIG. 4B by testing step 72. As illustrated in testing step 72, if the cable was inserted the wake up circuitry is activated so as to wake up the communication interface device. Such an implementation requires hardware which can detect a cable insertion. One such implementation has previously been discussed in connection with FIGS. 2 and 3 where IDCLK/CBINT line 48 is tied to wake up circuit 32 which can detect when communication adapter cable 22 is connected due to the rising level caused by pull up resistor R2 56. Other implementations may also be possible and FIGS. 2 and 3 are illustrative of only one preferred embodiment. Returning to FIG. 4B, once communication interface device 20 is awakened from the sleep mode, the cable ID is read as illustrated by read cable ID step 74.

Returning now to testing step 72, if the cable was removed while communication interface device 20 is in sleep mode, no immediate action occurs. Rather, communication interface device 20 simply remains in sleep mode until another event triggers communication interface device 20 to wake up. This is illustrated by wait step 76. Many events can trigger wake up of communication interface device 20. In one preferred embodiment, such events include, but are not limited to, any action by the user, any command sent to communication interface circuitry 34, incoming information from communication network 28, or other such event. In order for this preferred embodiment to operate properly, all that is needed is for communication interface device 20 to be able to detect upon wake up, that communication adapter cable 22 has been removed from the universal connection means. Upon wake up, then, communication interface device 20 attempts to read the cable identification code as illustrated in read cable ID step 74.

In one preferred embodiment, before entering sleep mode the cable identification value is saved. When the cable identification code is obtained through read cable ID step 74, the identification code obtained through this step is compared to the identification code saved before entering sleep mode. This is illustrated by compare step 78. If the identification codes are the same, the routine is exited as illustrated by branch 80. If, however, the identification codes are not the same then the cable was detached while communication interface device 20 was in sleep mode. In this case, either a new cable has been attached or no cable is presently attached to the universal connection means. Testing of these two conditions is illustrated by testing step 82. If the identification code indicates that a new communication adapter cable has been attached processing proceeds as indicated by branch B back in FIG. 4A. If, however, the identification code indicates that no communication adapter cable has been attached, then the interrupt hardware is set to detect a cable insertion, the base card code is reset to a default configuration, an indication is given to the user that a cable has been removed (such as by playing a removal tune), and the routine is exited.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A communication adapter cable for operatively interfacing a communication interface device to a given communication network, the communication cable comprising:

a) a universal connector means having a plurality of electrical leads for operatively and detachably connecting to the communication interface device;

b) a network connector means, electricaly connected to at least one of the plurality of electrical leads, for operatively and detachably connecting to the given communication network;

c) program storage means, electrically connected to at least one of the plurality of electrical leads, for storing a plurality of operating values corresponding to operative characteristics of the given communication network; and d) a means for transferring the operating values from the storage means to the communication interface device through at least one of the plurality of electrical leads to reconfigure the communication interface device.

2. A communication adapter cable as recited in claim 1 further comprising cable identification means, electrically connected to at least one of the electrical leads, for providing a cable type indicator signal to the communication interface device.

3. A communication adapter cable as recited in claim 1 wherein the operating values contained in the program storage means comprises executable instructions that are loaded to the communication interface device.

4. A communication adapter cable as recited in claim 1 wherein the operating values contained in the program storage means comprises network parameters that are loaded to the communication interface device.

5. A communication adapter cable as recited in claim 1 further comprising interrupt means for generating an interrupt to the communication interface device.

6. A communication adapter cable as recited in claim 5 wherein the interrupt is generated when the communication adapter cable is connected to the communication interface device.

7. A communication adapter cable as recited in claim 6 wherein the interrupt is used to transition the communication interface device from a low power sleep mode to an operational mode.

8. A communication adapter cable as recited in claim 5 wherein the interrupt is generated when the communication adapter cable is disconnected from the communication interface device.

9. A reconfigurable communication interface device for operatively interfacing with a plurality of communication networks, the interface device comprising:

a) a universal connector means for operatively and detachably connecting the interface device to a communication adapter cable;

b) a program storage means for storing a plurality of communication adapter cable identification codes;

c) processing means electrically connected to the program storage means and the universal connector means, for receiving a communication adapter cable identification signal from the universal connector means and comparing the received signal to the plurality of communication adapter cable identification codes stored in the program storage means; and d) loading means, electrically connected to the processing means, for loading a plurality of operating values corresponding to operating characteristics of a given communication network received by a transfer means from a communication adapter cable connected to the universal connector to reconfigure the communication interface device.

10. A reconfigurable communication interface device as recited in claim 9 wherein the operating parameters received by the loading means comprise executable instructions to be executed by the processing means.

11. A reconfigurable communication interface device as recited in claim 9 wherein the operating parameters received by the download means comprise network parameters.

12. A reconfigurable communication interface device as recited in claim 9 further comprising interrupt response means for responding to interrupts generated when a communications adapter cable is connected to or disconnected from the universal connector.

13. A reconfigurable communication interface device as recited in claim 12 wherein the interrupt response means is configured to cause the interface device to transition from a low power mode to an operating mode when a communications adapter cable is connected to the universal connector.

14. A reconfigurable communication interface device as recited in claim 9 further comprising means for configuring the universal connect or means to accommodate a specific communication adapter cable.

15. A reconfigurable communication interface as recited in claim 9, further comprising means for protecting foreign cables from damage upon insertion.

16. A reconfigurable communication interface system for operatively interfacing with a plurality of communication networks, the interface system comprising:

a) a communication adapter cable;

b) a reconfigurable communication interface device comprising:

i) a universal connector means for operatively and detachably connecting the interface device to the communication adapter cable;

ii) a first program storage means for storing a plurality of communication adapter cable identification codes;

iii) processing means, electrically connected to the first program storage means and the universal connector means, for receiving a communication adapter cable identification signal from the universal connector means and comparing the received signal to the plurality of communication adapter cable identification codes stored in the first program storage means;

iv) loading means, electrically connected to the processing means, for loading a plurality of operating values corresponding to operating characteristics of a given communication network received by a transfer means from the communication adapter cable to the reconfigurable communication interface device to reconfigure the reconfigurable interface device; and c) wherein said communication adapter cable comprises:

i) a first connector means having a plurality of electrical leads for operatively and detachably connecting to the communication interface device through the universal connector means;

ii) a second connector means, electrically connected to at least one of the plurality of electrical leads, for operatively and detachably connecting to the given communication network; and iii) a second program storage means, electrically connected to at least one of the plurality of electrical leads, for storing a plurality of operating values corresponding to operating characteristics of the given communication network and for providing said operating values to the loading means through a transfer means.

* * * * *